United States Patent [19]

Buese et al.

[11] Patent Number: 5,254,654
[45] Date of Patent: Oct. 19, 1993

[54] MONODISPERSED POLYDIMETHYLSILOXANE-α,ω-DIOL FLUIDS AND α,ω-SUBSTITUTED POLYDIMETHYLSILOXANES AND POLYDIMETHYLCYCLOSILOXANES PREPARED THEREFROM

[75] Inventors: Mark A. Buese, Upper Darby; Sejal Patel, Philadelphia, both of Pa.

[73] Assignee: Temple University of the Commonwealth System of Higher Education, Philadelphia, Pa.

[21] Appl. No.: 911,426

[22] Filed: Jul. 10, 1992

[51] Int. Cl.$^5$ ............................................. C08G 77/06
[52] U.S. Cl. ............................................. 528/14; 528/19; 528/31; 556/459; 556/462; 556/467
[58] Field of Search ..................... 528/14, 19, 31; 556/459, 462, 467

[56] References Cited

U.S. PATENT DOCUMENTS 3,308,203  3/1967  Metevia et al. .................. 528/14
3,943,091  3/1976  Akiyama .......................... 528/14
5,079,291  1/1992  Evans .............................. 556/459

OTHER PUBLICATIONS

Lucas et al., *J. Amer. Chem. Soc.*, 74, 5225 (1952).
Patnode et al., *J. Amer. Chem. Soc.*, 68, 358 (1946).
Noll, *Chemistry and Technology of Silicones*, pp. 192–198 Academic Press, New York, N.Y. (1968); and
Kazama et al., *Macromolecules* 24, 122 (1991).

*Primary Examiner*—Melvyn I. Marquis
*Attorney, Agent, or Firm*—Seidel, Gonda, Lavorgna & Monaco

[57] ABSTRACT

The molecular weight distribution of polydimethylsiloxane-α, ω-diol fluids is reduced by contacting the fluid with an alkaline earth metal hydride or hydroxide. Molecular weight distributions lower than Poisson distributions may be obtained. The resulting monodispersed polydimethylsiloxane-α, ω-diol fluids may be substituted by reaction with common silanating reagents to prepare telechelic polydimethylsiloxanes which are nearly monodispersed.

30 Claims, 1 Drawing Sheet

MONODISPERSED POLYDIMETHYLSILOXANE-α,ω-DIOL FLUIDS AND α,ω-SUBSTITUTED POLYDIMETHYLSILOXANES AND POLYDIMETHYLCYCLOSILOXANES PREPARED THEREFROM

FIELD OF THE INVENTION

The invention relates to the preparation of polydimethylsiloxane-α, ω-diols and derivatives thereof which have smaller than normal molecular weight distributions.

BACKGROUND OF THE INVENTION

Most polymeric materials are composed of mixtures of molecules of various sizes. The distribution of molecular weights is caused by the statistical nature of the polymerization process. The mechanical behavior and processing behavior of a polymer depends to some degree on the size distribution of the macromolecules comprising the sample. The polydispersity index $X_w/X_n$, where $X_w$ and $X_n$ are the weight average and number average degrees of polymerization, respectively, is a measure of molecular weight distribution. Where the ratio is unity, all molecules are of the same molecular weight, and the polymer composition is said to be monodispersed.

The synthesis of polydimethylsiloxane-α,ω-diols is typically carried out by the hydrolysis and condensation of dimethyldichlorosilanes, or by the ring-opening polymerization of octamethylcyclotetrasiloxane (Lucas et al., *J. Amer. Chem. Soc.*, 74, 5225 (1952); Patnode et al., *J. Amer. Chem. Soc.*, 68, 358 (1946); Noll, *Chemistry and Technology of Silicones*, p. 192-198, Academic Press, New York, N.Y., 1968). In these cases, a mixture of cyclic and linear siloxanes is formed. In general, a normal distribution of molecular weights results. The ring-opening polymerization of hexamethylcyclotrisiloxane can give polydimethylsiloxanes with Poisson distributions. See, e.g., Kazama et al., *Macromolecules* 24, 122 (1991). However, the result is a mixture of dimethylsiloxane homologues $HO\text{-}(Si(CH_3)_2O)_x\text{-}H$ wherein x is a multiple of three exclusively, i.e., 3, 6, 9, etc. A polycondensation approach to narrow molecular weight distribution product has not heretofore been demonstrated.

SUMMARY OF THE INVENTION

It is an object of the invention to provide for the preparation of low to moderate molecular weight polydimethylsiloxane-α, ω-diols which have narrower than normal molecular weight distributions.

It is an object of the invention to prepare polydimethylsiloxane-α, ω-diols which have a molecular weight distribution as narrow as or narrower than Poisson distribution, without a fractionalization procedure.

It is an object to provide such a process which is simple, solventless and quantitative, and avoids the production of cyclics.

It is an object to provide α,ω-substituted polydimethylsiloxanes, polydimethylcyclosiloxanes and mono- or disubstituted polydimethylcyclosiloxanes which have a narrower than normal molecular weight distribution.

These and other objects of the invention will be apparent from the following description.

In one embodiment, the invention is a process for reducing the molecular weight distribution of a polydimethylsiloxane-α, ω-diol fluid. The fluid is contacted with a catalyst comprising an alkaline earth metal hydroxide, oxide, hydride or mixture thereof for a time sufficient to result in the narrowing of the molecular weight distribution of the molecules of the fluid. The reduced molecular weight distribution fluid is then separated from the catalyst.

According to another embodiment, the invention is a process for preparing a reduced dispersivity polydimethylsiloxanes or mono- or disubstituted polydimethylsiloxane. The reduced dispersivity polydimethylsiloxane-α,ω-diol fluid is reacted with a monofunctional silanating agent or mixture thereof to provide a reduced dispersivity polydimethylsiloxane, monosubstituted or disubstituted polydimethylsiloxane, containing two more Si atoms than the polydimethylsiloxane-α, ω-diol from which the polydimethylsiloxane was derived.

In yet another embodiment, the reduced dispersivity polydimethylsiloxane-α,ω-diol fluid is reacted with a difunctional silanating agent to provide a reduced dispersivity polydimethylcyclosiloxane fluid or monosubstituted polydimethylcyclosiloxane fluid, or is cyclized by contact with a condensation catalyst to provide a reduced dispersivity polydimethylcyclosiloxane fluid.

By "reduced dispersivity" or "reduced molecular weight distribution" with respect to a condensation product as described herein is meant a material the molecules of which are characterized by a molecular weight distribution $(X_w/X_n)$ smaller than the normal distribution for a silanol condensation reaction, which is typically about 2.0. By "normal distribution" of a polymer is meant the molecular weight distribution according to the Flory-Schultz equation: $X_w/X_n = 1+p$, wherein p is the probability of finding a repeating unit rather than an end group for randomly observed units of the polymer. Preferably, the practice of the present invention results in fluids having a dispersivity of no more than 1.25, more preferably no more than 1.2, most preferably no more than 1.1.

By "polydimethylsiloxane-α,ω-diol" is meant, in more complete nomenclature, α,ω-dihydroxyoligo(dimethylsiloxane).

By "monosubstituted" polydimethylsiloxane or polydimethylcyclosiloxane is meant that the molecule is substituted at only one silicon atom, although the substitution at that silicon atom may comprise multiple substituents. By "disubstituted" is meant substitution at two different silicon atoms, although the substitution at each of the two silicon atoms may comprise multiple substituents. Thus, it may be appreciated that what we define herein as being "monosubstituted" does not exclude polymers of dimethylsiloxane wherein there is multiple substitution at a single silicon atom, e.g., the following substituted polydimethylcyclosiloxane

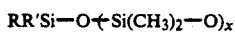

wherein R and R' are other than methyl.

By "polydimethylsiloxane" is meant to include a molecule characterized by repeating dimethylsiloxy units, including molecules which may be small enough to be denominated as an oligo(dimethylsiloxane).

In yet another embodiment, the invention pertains to the fluids prepared according to the above processes. The fluids comprise a population of various molecular weight homologues of polydimethylsiloxane-α,ω-diol, mono- or disubstituted polydimethylsiloxane, polydimethylcyclosiloxane, or monosubstituted polydimethylcyclosiloxane. The homologue population has a molecular weight distribution less than normal molecular weight distribution, and contains all consecutive homologues from the smallest homologue detectable in the fluid to the largest homologue detectable in the fluid.

DETAILED DESCRIPTION OF THE INVENTION

We have found that polydimethylsiloxane-α-ω-diols, upon contact with a catalyst comprising an alkaline earth hydroxide, oxide or hydride undergoes a size-selective self-polycondensation. Little, if any, cyclosiloxanes are formed in the process.

Figure 1:
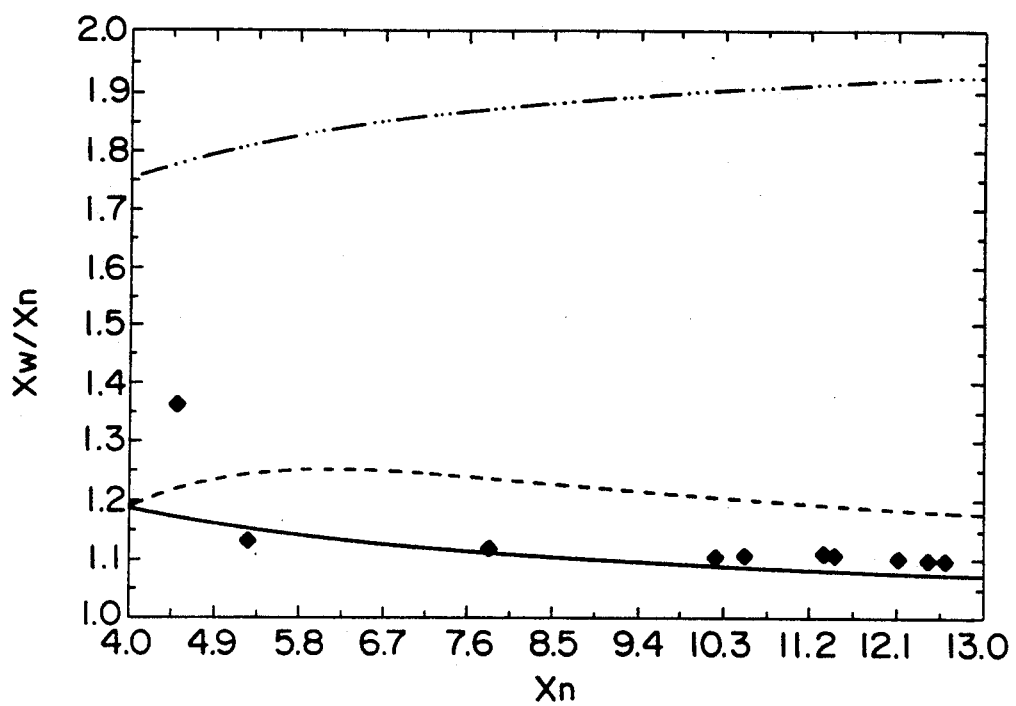
FIG. 1 is a plot of the dispersivity verses the degree of polymerization for: a size-dependent polycondensation of polydimethylsiloxane-α,ω-diol according to the present invention (♦), a Poisson distribution for the hypothetical living polymerization of silicone (—), an ideal polymerization of hexamethylcyclotrisiloxane (- - -), and a normal distribution (- . . . ).

Quite unexpectedly, treatment with alkaline earth hydroxides, oxides or hydrides results in a significant reduction in the molecular weight distribution of the polydimethylsiloxane-α, ω-diol fluid. The fluid after treatment has a lower than normal molecular weight distribution. So-called "normal" or Florey-Shultz molecular weight distribution (FIG. 1. - . . . ) is given by the equation $$\frac{X_W}{X_n} = 1 + p$$

wherein "p" is the probability of finding a repeating unit rather than an end group for randomly observed units of the polymer. See Flory, P. J. in *Principles of Polymer Chemistry*, Cornell University Press, Ithaca, N.Y. (1953), Chapter 8, for a detailed discussion of normal molecular weight distribution of polymers. A narrower than Poisson distribution may be obtained according to the present invention a the indicated molecular weight without the need for fractionization. (For a discussion of Poisson distribution see Szwarc, M. in *Carbanions, Living Polymers, and Electron-Transfer Processes*, John Wiley and Sons, Inc., N.Y. (1968), Chapter 2.) The process is simple, solventless and quantitative. The product fluid, which is recovered in nearly quantitative yield, may be easily isolated in pure form by filtration from the solid catalyst.

Without wishing to be bound by any theory, it is believed that alkaline earth metal hydroxides, oxides or hydrides catalyze the rapid size-selective self-polycondensation of the polydimethylsiloxane-α,ω-diol molecules. The reaction occurs with negligible siloxane bond redistribution. The latter results in a normal molecular weight distribution. In contrast to the alkaline earth metal hydroxides, oxides or hydrides, alkali metal catalysts favor redistribution over condensation, as the contact time increases. The catalysts useful in the practice of the present invention thus include solid, dry alkaline earth hydroxides, oxides and hydrides: Ca(OH)$_2$, Mg(OH)$_2$, Ba(OH)$_2$, CaO, MgO, BaO, CaH$_2$, MgH$_2$ and BaH$_2$. Ca(OH)$_2$ and CaO are preferred. No significant narrowing of the molecular weight distribution results from treatment with CaCO$_3$ or CaSO$_4$.

Almost no cyclization occurs in the process. The lack of cyclization contrasts to the hydrolytic bulk polycondensation of difunctional dimethylsilane where a significant portion of the resulting mixture consists of cyclocondensation products (Gilliam et al., *J. Am. Chem. Soc.* 63, 801 (1941)). Under conditions where redistribution occurs, cyclosiloxanes are formed by backbiting and are a significant portion of the resulting mixture. See, e.g., Beuse, *Macromolecules* 20, 694 (1987).

The solid catalytic material is advantageously disposed in the form of a catalyst bed. The bed may be used repeatedly without washing, if additional polydimethylsiloxane-α,ω-diol fluid is passed through the bed following use.

The fluid may be contacted with the catalyst in any vessel or device suitable for contacting liquid reactants with solid catalysts. The process may be carried out batchwise or in continuous fashion.

Generally, the contact time will depend on the amount of catalyst, the surface area of the catalyst, the extent of stirring of the reaction mixture, the temperature, and other factors. For example, the rate at which the condensation occurs depends on the quantity and mesh of the catalyst used. Stirring increases the rate of the condensation. Heating increases the rate of the condensation yet provides nearly identical molecular weight distributions for equivalent degrees of polymerization.

The contact time may be conveniently varied to achieve the desired increase in molecular weight and the desired narrowing of the molecular weight distribution. The longer the contact time for a given set of conditions, the higher the molecular weight, and the narrower the molecular weight distribution becomes, as the self-condensation reaction proceeds to completion. Contact times can generally range from about 5 minutes to a week, more preferably from about 10 minutes to a week, depending on what is desired. Most preferably, the conditions are selected so that the contact time is from about 15 minutes to about 8 hours.

A wide range of temperatures may be employed. The temperature is most advantageously selected from the range of from about 0° to about 200° C., depending on the catalyst, preferably from about 25° to 140° C. Most preferably the temperature is from about 100° C. to about 140° C.

No solvent is required in the process. The desired fluid, produced in nearly quantitative yield, may be isolated in pure form by filtration from the solid catalyst according to standard techniques.

The process yields a particularly narrow molecular weight distribution of siloxane oligomer. For example, the process may be carried out by condensing an inexpensive commercially available polydimethylsiloxane-α,ω-diol fluid which has an average degree of polymerization of 5 and a dispersivity $(X_w/X_n)$" of greater than 1.3. Condensation can be carried out until the fluid reaches the number average degree of polymerization 12. At this point, the molecular weight distribution that is observed ($X_w/X_n$) is about 1.1 or less. This is substantially lower than the dispersivity which would be expected from a normal random molecular weight distribution formed during a condensation process ($X_w,X_n = 1.9167$); from a polymerization of octamethylcyclotetrasiloxane ($X_w/X_n = 1.9167$); or from a living ring opening polymerization of hexamethylcyclotrisiloxane ($X_w,X_n = 1.25$).

Although the dispersivity of the hexamethyldisiloxane ring opening polymerization product is almost as small as the dispersivity of the self-condensation product according to the present invention, the respective products differ significantly in the degree of polymerization. For example, using the equation for the theoretical weight fraction, $w_i$, of a homologue of size, i, in a Poisson distribution of a polymer with a kinetic chain length, r, of 3.67 (11 dimethylsiloxy units in a hexamethylcyclotrisiloxane polymerization), $$W_i = r^{(i-1)} e^{-r(i-1)}/[(i-1)!(r+1)]$$

one can calculate that 4.6% of the homologues are $i \leq 6$, and 6.9% of the homologues are $i \geq 24$ for the hexamethylcyclotetrasiloxane polymerization. In comparison $W_i$ for $i \leq 6$ and $i \geq 24$ are 1.3 and 0.1%, respectively, for the inventive size-dependent polycondensation to an average degree of polymerization of 11.

The degree of polymerization attained according to the practice of the present invention ranges, for the most part, between 7 and 20, with a dispersivity, $X_w,X_n$, of no more than about 1.25.

Moreover, the result of the living ring opening polymerization of hexamethylcyclotrisiloxane is a mixture of polydimethylsiloxanes homologues of the formula $$HO-(-Si(CH_3)_2O-)_x H$$

wherein x is a multiple of three. The mixture contains the 3-mer, 6-mer, 9-mer, etc., but no 4-mer, 5-mer, 7-mer, 8-mer, etc. By contrast, the present invention provides for polydimethylsiloxane fluids of reduced molecular weight distribution containing each consecutive homologue from the smallest to the largest homologue detectable in the fluid. Thus, for a representative mixture having a number average degree of polymerization ($X_n$) of five, all homologues from the smallest ($x=2$) through the largest ($X=18$) are found represented in the mixture.

The monodispersed polydimethylsiloxane-α,ω-diol fluids produced according to the present invention may be substituted or "end-capped" with a variety of monofunctional silanating agents to yield α,ω-disubstituted polydimethylsiloxanes, monosubstituted polydimethylsiloxanes or unsubstituted polydimethylsiloxanes, which are narrow in molecular weight distribution and contain two more silicone atoms than the diol fluid from which they were derived. Methods for end-capping polydimethylsiloxane diols are well known to those skilled in the art. The end-capping agent is simply mixed with the diol fluid at room temperature. A mixture of different silanating agents may be used to provide α,ω-disubstituted polydimethylsiloxanes with different functional groups. The capping reaction typically occurs in a matter of minutes. Some of the agents useful for this purpose are defined according to the formula $$R_n R^1_{3-n} SiY$$

wherein n is 0, 1, 2 or 3; and

R and $R^1$ are independently selected from the group consisting of hydrogen; $C_1$-$C_{18}$ straight and branched chain alkyl, alkenyl, alkynyl and aryl particularly phenyl; and $C_1$-$C_{18}$ straight or branched chain alkyl, alkenyl, alkynyl and aryl, substituted by one or more radicals selected from the group consisting of amino, $C_1$-$C_8$ alkylamino, arylamino, cyano, isocyanato, $C_1$ to $C_8$ carboxyl, $C_1$ to $C_8$ carboxylate, $C_1$ to $C_8$ carboxylic acid halide, $C_1$ to $C_8$ carboxylic acid anhydride, amido, chloro, bromo, iodo, hydroxy, $C_1$ to $C_8$ alkoxy, thiol, sulfyl, disulfyl, sulfonyl, aryl sulfonate, $C_1$ to $C_8$ alkyl sulfonate, acrylate and methacrylate.

If the $C_1$-$C_{18}$ hydrocarbon is substituted, it is preferably monosubstituted. The alkenyl moiety, either substituted or unsubstituted, is preferably a mono- or di-ene, with vinyl and allyl being particularly preferred. The alkynyl moiety, either substituted or unsubstituted, contains only one triple bond.

The group Y is a radical selected from the group consisting of chloro, bromo, iodo, amino, N-methylamino, N,N-dimethylamino, acetamido, N-methylacetamido, trifluoroacetamido, N-methyltrifluoroacetamido and acetoxy.

Except for the acetoxy and halide capping agents, no catalyst is required for the capping reaction. An amine or other basic catalyst may be required to promote the capping reaction in the case where Y is acetoxy or halide.

The capping reaction results in the formation of a fluid comprising a population of various homologues of a α,ω-substituted polydimethylsiloxane of the formula $$R_n R^1_{3-n} Si-O-(-Si(CH_3)_2-O-)_p SiR_n R^1_{3-n}$$

wherein R, $R^1$ and n are defined as above, and p ranges from 7 to 20, inclusive. It may be appreciated that wherein R and $R^1$ of the capping agent are all methyl, the resulting polydimethylsiloxane is unsubstituted.

Silanating agents wherein R is methyl, n is 2 and $R^1$ is hydrogen are particularly useful as capping agents, resulting in a series of homologues of the formula $$H(CH_3)_2Si-O-(-Si(CH_3)_2-O-)_p Si(CH_3)_2H$$

wherein p ranges from 7 to 20 inclusive.

Once so capped, a wide variety of telechelic polymers may be formed by hydrosilation reactions. For example, polymers characterized by the 3-hydroxypropyl, 3-aminopropyl, 3-chloropropyl, 3-cyanopropyl, 2-(chlorobenzyl)ethyl, 3-acryloxypropyl, 3-methacryloxypropyl, and other functional groups may be made for use in the preparation of methacrylate copolymers, carbonate polymers, urethane copolymers, imide copolymers, and the like. The Si-H group of the dimethylsilyl moiety may be converted into an Si-Cl group which may be used in a variety of reactions, such as in the conversion into alkoxy end-capped siloxanes. Alternatively, Si-H-containing compounds can be used directly for hydrosilation cured systems.

Mono-, di- and trialkoxysilyl end groups can be introduced directly into the diol by the use of reagents such as N,N-dimethylaminodimethylmethoxysilane. Polymers capped in this manner would be useful in the preparation of silicones via hydrolysis condensation reactions.

The introduction of Si-vinyl end groups may be achieved using compounds such as dimethylaminovinyldimethylsilane. Materials thus functionalized are useful in hydrosilation cured systems.

When the monodispersed polydimethylsiloxane-$\alpha,\omega$-diol fluids are substituted in the manner described above, the molecular weight distribution remains unchanged. This is in marked contrast to statistical processes where a fluid having a number average degree of polymerization $(X_n)$ of 14 will have a polydispersivity $(X_w/X_n)$ of 1.9386.

The monodispersed polydimethylsiloxane-$\alpha,\omega$-diols may be cyclized under appropriate conditions to yield corresponding monosubstituted polydimethylcyclosiloxanes containing one more $(CH_3)_2Si$ groups than the parent diol fluid. Cyclization may be carried out by reacting the monodispersed linear diol with a difunctional, as opposed to a monofunctional, silanating agent. Such difunctional silanating agents useful as cyclization agents for this purpose include, for example, the compounds according to the formula

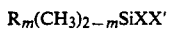

wherein m is 0, 1 or 2;

R is defined as above; and

X and X', same or different, are defined in the same manner as Y, above.

The cyclization reaction results in the formation of a fluid comprising a population of various homologues of mono- or disubstituted polydimethylcyclosiloxanes of the formula

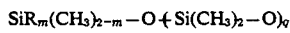

wherein R and m are defined as above and q ranges from 7 to 20 inclusive. Most preferably, m is 1.

The difunctional silanating agent is reacted with the diol under dilute solution conditions. The diol fluid is thus added slowly to a solution at the same rate as the silanating agent. If the reaction between the silanating agent and the diol is rapid, the concentration of the two reagents may be maintained below the equilibrium cyclic concentrations for the cyclics. Only cyclics will form. With the proper choice of silanating agent, the cyclics will not redistribute, and will act as a diluent or solvent in the system. As with the monofunctional end-capping reaction, no catalyst is needed except where the leaving group X or X' is acetoxy or halide.

Initially, a solvent is necessary in order to maintain the concentration of the silanol reactant below the concentration at which intermolecular condensation occurs. Once the reaction begins, the product acts as a diluent, and the quantity of solvent needed depends on the size of the molecules comprising the diol fluids. Generally, the larger the diol, the lower its concentration must be in the condensation reaction. The amount of solvent in the system is selected accordingly.

The temperature of the capping reaction may vary from about room temperature to about the boiling point of the solvent. The solvent may comprise an aliphatic or aromatic hydrocarbon, a chlorinated hydrocarbon, an ether, or a siloxane, such as octamethylcyclotetrasiloxane, hexamethyldisiloxane or the cyclosiloxane product mixture itself. Representative preferred solvents include toluene, ethers and alkanes. The solvent is selected so as to be inert with respect to the silanating agent and the diol reactants. Thus, nucleophilic solvents such as alcohols are generally not applicable. Amines may be utilized, principally tertiary amines. While amines are less preferred as solvents, they may be used because they are not generally nucleophilic toward the silanating agent.

Alternatively, reduced molecular weight distribution cyclics may be prepared by use of a condensation catalyst suitable for the cyclization of linear polydimethylsiloxane diols. A condensation catalyst which will not distribute siloxane bonds is required. The catalyst is added to the diol fluid diluted by a solvent. LiOH is the preferred catalyst. The solvent may comprise any of the solvents used for the end-capping reaction described above except that chlorinated aliphatic hydrocarbons should not be used. The temperature of the cyclization reaction may range from about room temperature to about the boiling point of the solvent. The reaction results in the formation of mixed cyclic/linear fluids due to the competing formation of linear products.

The practice of the invention is illustrated by the following non-limiting examples. Gas chromatographic analyses through Example 7 were carried out using a Hewlett-Packard 5890A gas chromatograph equipped with a 6 ft. $\times \frac{1}{8}$ inch outside diameter column packed with 3% OV-101 on CHROMOSORB W-HP and a thermal conductivity detector.

EXAMPLE 1

One gram $CaH_2$ was placed in a vial containing 10 grams (25 mmols) of low molecular weight polydimethylsiloxane-$\alpha,\omega$-diol having a small molecular weight distribution (PS340, Hüls Amerika) and average degree of polymerization of 4.49. A fourth vial containing the same amount of polydimethylsiloxane-$\alpha$, $\omega$-diol was end-capped with N-methyl,N-(trimethylsylyl)trifluoroacetamide for gas chromatographic analysis. End capping is necessary prior to chromatographic analysis since silanols react with gas chromatographic equipment. Capping was achieved by adding one ml of the fluid to a vial containing 0.5 ml of N-methyl,N-(trimethylsilyl)trifluoroacetamide. The mixture became hot. Upon cooling (about 5 minutes), a sample was injected into a gas chromatograph for determination of the molecular weight distribution of the end-capped polydimethylsiloxane-$\alpha,\omega$-diol fluid (t=0.0 hours). Thereafter, aliquots of the catalyst-containing vials were similarly end-capped at different time intervals, and molecular weight distributions were analyzed by gas chromatography. The experiment was concluded after 28 hours. A significant narrowing of molecular weight distribution accompanied an increase in molecular weight. The breadth of the molecular weight distribution was smaller than that of a normal distribution (FIG. 1, -.... ) throughout the reaction. The distribution quickly became similar to that of the Poisson distribution for the hypothetical living polymerization of silicone (FIG. 1, —), and significantly lower than the distribution for an ideal polymerization of hexamethylcyclotrisiloxane (FIG. 1, (- - -). From an initial molecular weight distribution ($X_w/X_n$) of 1.36, a final molecular weight distribution of 1.15 was attained. The polymerization of hexamethylcyclotrisiloxane ( - - - ) has been idealized in FIG. 1 to one dimensional growth of oligomer through addition of one cyclic trimer at a time.

EXAMPLE 2

Example 1 was repeated except that the reaction was conducted in constant temperature baths at 25° C. or 105° C., and the initial (t=0) molecular weight distribution ($X_w/X_n$) and average degree of polymerization ($X_n$) were 1.36 and 5.26, respectively. That the base truly catalyzed the condensation of the silanol rather than acting only as a water scavenger was indicated by the lack of any molecular weight build or redistribution when dehydration was promoted by the distillation of water from the system as a toluene azeotrope. Heating increased the rate of the condensation yet gave very similar molecular weight distributions for equivalent degrees of polymerization. See Table 1 (entries are ±0.05).

TABLE 1

Size and Molecular Weight Distribution for
$CaH_2$-Catalyzed Condensation vs. Time

| Time | 25° C. | | 105° C. | |
| --- | --- | --- | --- | --- |
| (hrs.) | $X_n$ | $X_w/X_n$ | $X_n$ | $X_w/X_n$ |
| 0.0 | 5.26 | 1.36 | 5.26 | 1.36 |
| 0.5 | 5.78* | 1.26 | 7.61 | 1.17 |
| 1.5 | 5.70 | 1.23 | 7.83 | 1.13 |
| 2.0 | 6.25 | 1.28 | 8.56 | 1.12 |
| 3.5 | 6.69 | 1.20 | 10.29 | 1.11 |
| 6.0 | 6.67 | 1.21 | 10.51 | 1.11 |
| 7.5 | 6.88 | 1.21 | 11.45 | 1.11 |
| 9.0 | 7.26 | 1.16 | 11.33 | 1.11 |
| 13.0 | 7.49 | 1.18 | 12.60* | 1.09 |
| 15.0 | 8.54 | 1.14 | 12.41 | 1.05 |

*These values are anomalous and may result from measurement errors.

Figure 2:
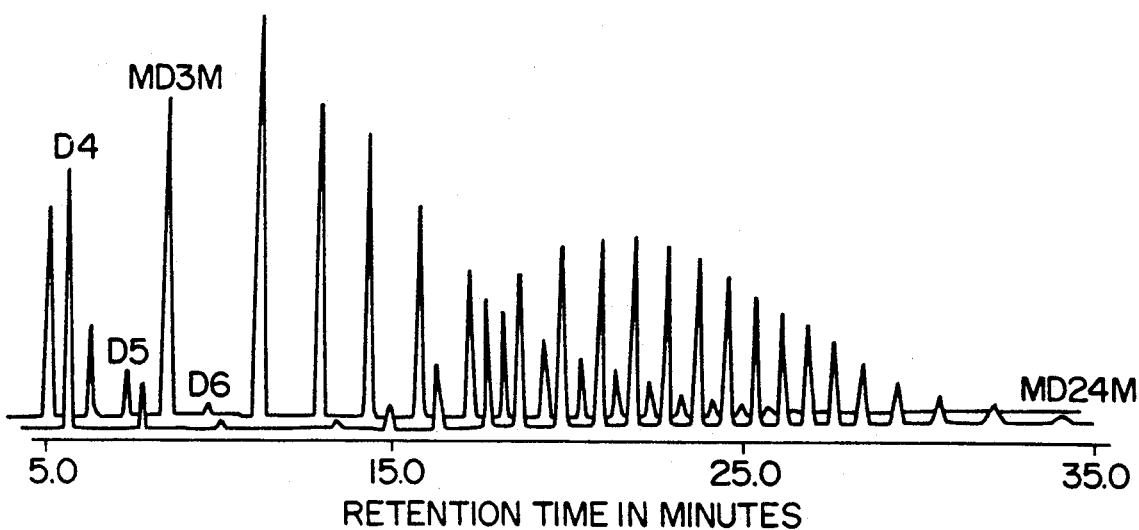
FIG. 2 contains gas chromatograph traces of end-capped polydimethylsiloxane-α-ω-diol fluid before (background trace) and 15 hours after (foreground trace) treatment with CaH$_2$ at 105° C. Solid peaks D4, D5 and D6 represent cyclic species contained in the original fluid. End-capped linear trimer through 24-mer appear as open peaks marked MD3M through MD24M. An unmarked open peak corresponding to end-capped dimer appears between peaks D4 and D5.

FIG. 2 contains gas chromatograph traces of the end-capped Example 2 fluid before (background trace) and 15 hours after (foreground trace) addition of $CaH_2$ at 105° C. Cyclic 4-, 5-and 6-mers present in the original fluid appear as solid peaks to the left (D4, D5 and D6, respectively). End-capped linear species comprise the open peaks MD2M through MD24M. The peak at about 15 minutes retention time in the foreground trace represents end-capped hexamer, while the last discernable peak, MD24M, represents end-capped 24-mer. A 25-mer is not distinguishable from the gas chromatography background.

EXAMPLE 3

Example 1 was repeated, substituting $Ca(OH)_2$ for $CaH_2$. A final number average degree of polymerization of 7.02 and molecular weight distribution of 1.15 were obtained after 28 hours at room temperature.

EXAMPLE 4

Two flasks each containing 1 gram of $CaH_2$ (24 mmoles) and 10 grams (25 mmoles) of the same low molecular weight polydimethylsiloxane-α, ω-diol used in Example 1, were placed in constant temperature baths at 25° C. and 105° C. respectively. Aliquots were removed at various time intervals and analyzed by gas chromatography after end-capping with N-methyl,N-(trimethylsilyl)trifluoroacetamide. At the end of 15 hours, the molecular weight increased from an initial value of approximately 400 g/mole to 1,000 g/mole, whereas the molecular weight distribution decreased from 1.36 to 1.05.

EXAMPLE 5

One ml of the monodispersed polydimethylsiloxane-α,ω-diol treated formed according to Example 1 was added to a vial containing 0.5 grams of N,N-dimethylaminodimethylsilane. The mixture displayed an exotherm and dimethylamine gas was immediately formed. After 15 minutes, analysis by gas chromatography was carried out, which indicated complete conversion of the silanol and the capping of the dimethylsiloxane chain with $(CH_3)_2SiH$ groups.

EXAMPLE 6

One ml of the low molecular weight polydimethylsiloxane-α, ω-diol treated with $CaH_2$ according to Example 1 was added to a vial containing 0.5 grams of trimethylchlorosilane and 0.5 grams of pyridine. The mixture became hot. After one hour, gas chromatography was performed on an aliquot. The chromatographic trace indicated that only 70% of the silanol was end-capped with trimethylsilyl groups.

EXAMPLE 7

Cyclization of Monodispersed
Polydimethylsiloxane-α,ω-diol

A three-necked round bottom flask was equipped with a magnetic stirring bar, a condenser fitted with a $CaSO_4$ drying tube at the outlet, and two addition funnels. One funnel contained 12 g (0.10 moles) of bis(methylamino)dimethylsilane in diethylether (total volume=200 ml) and the other contained 47.8 g (0.10 moles) of monodispersed polydimethylsiloxane-α, ω-diol in diethylether (total volume=200 ml). The flask was charged with 200 ml of diethylether and the two reagents were added dropwise at a very slow but constant rate such that equal volumes of the reagents were added to the flask. After the addition was completed, ether was distilled from the flask leaving a viscous liquid. A 1 gram aliquot of the reagent monodispersed polydimethylsiloxane-α,ω-diol was capped by the addition of 0.5 g of N-methyl,N-(trimethylsilyl)trifluoroacetamide. The reagent diol fluid, the trimethylsilyl end-capped fluid and the bis(methylamino)dimethylsilane reaction product were analyzed by proton nuclear magnetic resonance and gas chromatography. The reaction product was determined to be a mixture of cyclosiloxanes with one more $(CH_3)_2Si$ group than the diol fluid. An average ring size of 7.2 was obtained after subtracting the cyclic tetramer, pentamer and hexamer present in the diol fluid. The same molecular weight distribution of the diol, 1.15, was obtained for the cyclics, after correction for the cyclics present in the diol fluid.

EXAMPLE 8

A flask was charged with 10.00 g of α,ω-dihydroxyoligo(dimethylsiloxane) fluid and 1.00 gram calcium hydroxide. The flask was immediately placed into an oil bath at 120° C. and aliquots of the silanol fluid were taken at various times. These aliquots were end-capped with an excess of N-methyl,N-(trimethylsilyl)trifluoroacetamide and gas chromatographic analysis carried out for each aliquot. A Hewlett-Packard 5890 gas chromatograph with a thermal conductivity detector and silicone-coated I.D. 0.53 mm ×30 m capillary column was used for this and all of the analyses described hereinafter. A significant increase in the molecular weight accompanied by a narrowing of the molecular weight distribution was observed. The initial average number of dimethylsiloxy groups per molecule ($X_n$) was 4.97 and the molecular weight distribution ($X_w/X_n$) was 1.32. A final $X_n$ of 11.20 and molecular weight distribution of 1.14 was obtained in 45 minutes. The data are tabulated in Table 2 (entries are ±0.05).

TABLE 2

Size and Molecular Weight Distribution For $Ca(OH)_2$-Catalyzed Condensation vs. Time

| Time in Minutes | $X_n$ | $X_w/X_n$ |
| --- | --- | --- |
| 0 | 4.97 | 1.32 |
| 5 | 6.55 | 1.27 |
| 10 | 7.63 | 1.21 |
| 15 | 8.42 | 1.17 |
| 20 | 9.15 | 1.15 |
| 30 | 10.58 | 1.13 |
| 45 | 11.20 | 1.14 |

EXAMPLE 9

A flask was charged With 10.00 g of α,ω-dihydroxyoligo(dimethylsiloxane) fluid and 1.00 gram calcium oxide. The flask was immediately placed into an oil bath at 120° C. and aliquots of the silanol fluid were taken at various times. These aliquots were end-capped with an excess of N-methyl,N-(trimethylsilyl)trifluoroacetamide and a gas chromatographic analysis carried out for each aliquot. A significant increase in the molecular weight accompanied by a narrowing of the molecular weight distribution was observed. The initial average number of dimethylsiloxy groups per molecule ($X_n$) was 4.97 and the molecular weight distribution ($X_w/X_n$) was 1.32. A final $X_n$ of 9.86 and molecular weight distribution of 1.14 was obtained in 60 minutes. The data are tabulated in Table 3 (entries are ±0.05).

TABLE 3

Size And Molecular Weight Distribution For CaO-Catalyzed Condensation vs. Time

| Time in Minutes | $X_n$ | $X_w/X_n$ |
| --- | --- | --- |
| 0 | 4.97 | 1.32 |
| 5 | 5.85 | 1.29 |
| 10 | 6.24 | 1.24 |
| 15 | 6.60 | 1.23 |
| 20 | 7.53 | 1.22 |
| 30 | 8.03 | 1.18 |
| 45 | 8.93 | 1.17 |
| 60 | 9.86 | 1.14 |

COMPARATIVE EXAMPLE 10

A flask was charged with 10.00 g of α,ω-dihydroxyoligo(dimethylsiloxane) fluid and 1.00 gram calcium carbonate. The flask was immediately placed into an oil bath at 120° C. and aliquots of the silanol fluid were taken at various times. These aliquots were end-capped with an excess of N-methyl, N-(trimethylsilyl)trifluoroacetamide and a gas chromatographic analysis carried out for each aliquot. No significant increase in the molecular weight or narrowing of the molecular weight distribution was observed.

COMPARATIVE EXAMPLE 11

A flask was charged with 10.00 g of α,ω-dihydroxyoligo(dimethylsiloxane) fluid and 1.00 gram calcium sulfate. The flask was immediately placed into an oil bath at 120° C. and aliquots of the silanol fluid were taken at various times. These aliquots were end-capped with an excess of N-methyl,N-(trimethylsilyl)trifluoroacetamide and a gas chromatographic analysis carried out for each aliquot. No significant increase in the molecular weight or narrowing of the molecular weight distribution was observed.

The present invention may be embodied in other specific forms without departing from the spirit or essential attributes thereof and, accordingly, reference should be made to the appended claims, rather than to the foregoing specification, as indicating the scope of the invention.

We claim:

1. A process for reducing the molecular weight distribution of a polydimethylsiloxane-α,ω-diol fluid comprising
    contacting the fluid with a catalyst comprising an alkaline earth metal hydroxide, oxide, hydride or mixture thereof for a time sufficient to result in the narrowing of the molecular weight distribution of the molecules of said fluid, and
    separating the reduced dispersivity fluid from the catalyst.

2. A process according to claim 1 wherein the catalyst is an alkaline earth metal hydroxide or oxide.

3. A process according to claim 2 wherein the catalyst is $Ca(OH)_2$ or CaO.

4. A process according to claim 1 wherein the temperature is from about 0° C. to about 200° C.

5. A process according to claim 4 wherein the temperature is from about 25° C. to about 140° C.

6. A process for preparing a reduced dispersivity polydimethylsiloxane fluid, or mono- or disubstituted polydimethylsiloxane fluid, comprising
    contacting a polydimethylsiloxane-α,ω-diol fluid with a catalyst comprising an alkaline earth metal hydroxide, oxide, hydride or mixture thereof for a time sufficient to result in a reduced dispersivity polydimethylsiloxane-α,ω-diol fluid,
    separating the reduced dispersivity diol fluid from the catalyst,
    reacting the reduced dispersivity diol fluid with a monofunctional silanating agent or mixture thereof to provide a reduced dispersivity polydimethylsiloxane, or monosubstituted or disubstituted polydimethylsiloxane, containing two more silicon atoms than the polydimethylsiloxane-α,ω-diol from which said polydimethylsiloxane was derived.

7. A process according to claim 6 wherein the silanating agent is selected from the formula $R_nR^1_{3-n}SiY$
    wherein
    n is 0, 1, 2 or 3;
    R and $R^1$ are independently selected from the group consisting of hydrogen; $C_1$-$C_{18}$ straight and branched chain alkyl, alkenyl, alkynyl and aryl; and $C_1$-$C_{18}$ straight or branched chain alkyl, alkenyl, alkynyl and aryl, substituted by a radical selected from the group consisting of amino, $C_1$ to $C_8$ alkylamino, arylamino, cyano, isocyanato, $C_1$ to $C_8$ carboxyl, $C_1$ to $C_8$ carboxylate, $C_1$ to $C_8$ carboxylic acid halide, $C_1$ to $C_8$ carboxylic acid anhydride, amido, chloro, bromo, iodo, hydroxy, $C_1$ to $C_8$ alkoxy, thiol, sulfyl, disulfyl, sulfonyl, aryl sulfonate, $C_1$ to $C_8$ alkyl sulfonate, acrylate and methacrylate; and Y is selected from the group consisting of chloro, bromo, iodo, amino, N-methylamino, N-dimethylamino, acetamido, N-methylacetamido, trifluoroacetamido, N-methyltrifluoroacetamido and acetoxy.

8. A process according to claim 7 wherein R is methyl, $R^1$ is hydrogen, and n is 2 in the silanating agent.

9. A process according to claim 6, 7 or 8 wherein the catalyst is $Ca(OH)_2$ or CaO.

10. A process for preparing a reduced dispersivity polydimethylcyclosiloxane or monosubstituted polydimethylcyclosiloxane fluid comprising
contacting a polydimethylsiloxane-α,ω-diol fluid with a catalyst comprising an alkaline earth metal hydroxide, oxide, hydride or combination thereof for a time sufficient to provide a reduced dispersivity polydimethylsiloxane-α,ω-diol fluid,
separating the reduced dispersivity diol fluid from the catalyst,
reacting the reduced dispersivity diol fluid with a difunctional silanating agent to provide a reduced dispersivity polydimethylcyclosiloxane or monosubstituted polydimethylcyclosiloxane fluid.

11. A process according to claim 10 wherein the difunctional silanating agent is selected from the formula $R_m(CH_3)_{2-m}SiXX'$ wherein m is 0, 1 or 2;

R is selected from the group consisting of hydrogen; $C_1$-$C_{18}$ straight and branched chain alkyl, alkenyl, alkynyl and aryl; and $C_1$-$C_{18}$ straight or branched chain alkyl, alkenyl, alkynyl and aryl, substituted by a radical selected from the group consisting of amino, $C_1$ to $C_8$ alkylamino, arylamino, cyano, isocyanato, $C_1$ to $C_8$ carboxyl, $C_1$ to $C_8$ carboxylate, $C_1$ to $C_8$ carboxylic acid halide, $C_1$ to $C_8$ carboxylic acid anhydride, amido, chloro, bromo, iodo, hydroxy, $C_1$ to $C_8$ alkoxy, thiol, sulfyl, disulfyl, sulfonyl, aryl sulfonate, $C_1$ to $C_8$ alkyl sulfonate, acrylate and methacrylate; and X and X', same or different, are selected from the group consisting of chloro, bromo, iodo, amino, N-methylamino, N-dimethylamino, acetamido, N-methylacetamido, trifluoroacetamido, N-methyltrifluoroacetamido and acetoxy.

12. A process according to claim 10 or 11 wherein the catalyst is $Ca(OH)_2$ or CaO.

13. A process for preparing a reduced dispersivity polydimethylcyclosiloxane fluid comprising
contacting a polydimethylsiloxane-α,ω-diol fluid with a catalyst comprising an alkaline earth metal hydride, oxide, hydroxide, or combination thereof for a time sufficient to provide a reduced dispersivity polydimethylsiloxane-α,ω-diol fluid,
separating the reduced dispersivity diol fluid from the catalyst,
cyclizing the reduced dispersivity diol fluid by contact with a condensation catalyst to provide polydimethylcyclosiloxane fluid having reduced dispersivity.

14. A process according to claim 13 wherein the condensation catalyst is LiOH.

15. A reduced molecular weight distribution polydimethylsiloxane-α, ω-diol fluid prepared according to the process of claim 1.

16. A reduced dispersivity α,ω-substituted polydimethylsiloxane fluid prepared according to the process of claim 4.

17. A reduced dispersivity monosubstituted polydimethylcyclosiloxane fluid prepared according to the process of claim 10.

18. A reduced dispersivity polydimethylcyclosiloxane fluid prepared according to the process of claim 13.

19. A fluid comprising a population of various molecular weight homologues of polydimethylsiloxane-α,ω-diol, polydimethylsiloxane, or monosubstituted or disubstituted polydimethylsiloxane, said homologue population having a molecular weight distribution less than normal molecular weight distribution, said population containing all consecutive homologues from the smallest homologue detectable in the fluid to the largest homologue detectable in the fluid.

20. A fluid according to claim 19 having a dispersivity of no more than 1.25.

21. A fluid according to claim 20 having a dispersivity of no more than 1.2.

22. A fluid according to claim 21 having a dispersivity of no more than 1.1.

23. A fluid according to claim 20 of the formula

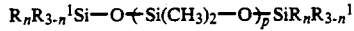

wherein

R and $R^1$ are independently selected from the group consisting of hydrogen; $C_1$-$C_{18}$ a straight and branched chain alkyl, alkenyl, alkynyl and aryl; and $C_1$-$C_{18}$ straight or branched chain alkyl, alkenyl, alkynyl and aryl, substituted by a radical selected from the group consisting of amino, $C_1$ to $C_8$ alkylamino, arylamino, cyano, isocyanato, $C_1$ to $C_8$ carboxyl, $C_1$ to $C_8$ carboxylate, $C_1$ to $C_8$ carboxylic acid halide, $C_1$ to $C_8$ carboxylic acid anhydride, amido, chloro, bromo, iodo, hydroxy, $C_1$ to $C_8$ alkoxy, thiol, sulfyl, disulfyl, sulfonyl, aryl sulfonate, $C_1$ to $C_8$ alkyl sulfonate, acrylate and methacrylate;

n is 0, 1, 2 or 3; and p ranges from 7 to 20.

24. A fluid according to claim 23 wherein R is methyl, $R^1$ is hydrogen and n is 2.

25. A fluid comprising a population of various molecular weight homologues of polydimethylcyclosiloxane, or monosubstituted polydimethylcyclosiloxane, said homologue population having a molecular weight distribution less than normal molecular weight distribution, said population containing all consecutive homologues from the smallest homologue detectable in the fluid to the largest homologue detectable in the fluid.

26. A fluid according to claim 25 having dispersivity of no more than 1.25.

27. A fluid according to claim 26 having a dispersivity of no more than 1.2.

28. A fluid according to claim 27 having a dispersivity of no more than 1.1.

29. A fluid according to claim 26 comprising a population of polydimethylcyclosiloxane homologues of the formula

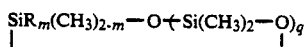

wherein
R is selected from the group consisting of hydrogen; $C_1$-$C_{18}$ straight and branched chain alkyl, alkenyl, alkynyl and aryl; and $C_1$-$C_{18}$ straight or branched chain alkyl, alkenyl, alkynyl and aryl, substituted by a radical selected from the group consisting of amino, $C_1$ to $C_8$ alkylamino, arylamino, cyano, isocyanato, $C_1$ to $C_8$ carboxyl, $C_1$ to $C_8$ carboxylate, $C_1$ to $C_8$ carboxylic acid halide, $C_1$ to $C_8$ carboxyl anhydride, amido, chloro, bromo, iodo, hydroxy, $C_1$ to $C_8$ alkoxy, thiol, sulfyl, disulfyl, sulfonyl, aryl sulfonate, $C_1$ to $C_8$ alkyl sulfonate, acrylate and methacrylate;

m is 0, 1 or 2; and q ranges from 7 to 20.

30. A fluid according to claim 29 wherein m is 1.

* * * * *